June 22, 1948.  F. W. MOFFETT, JR  2,443,865
DRYING TRUCK FOR HAY OR OTHER MATERIALS
Filed Dec. 7, 1945  3 Sheets-Sheet 1

INVENTOR.
Frank Wesley Moffett, Jr.
BY Harold E. Stonebraker
his Attorney

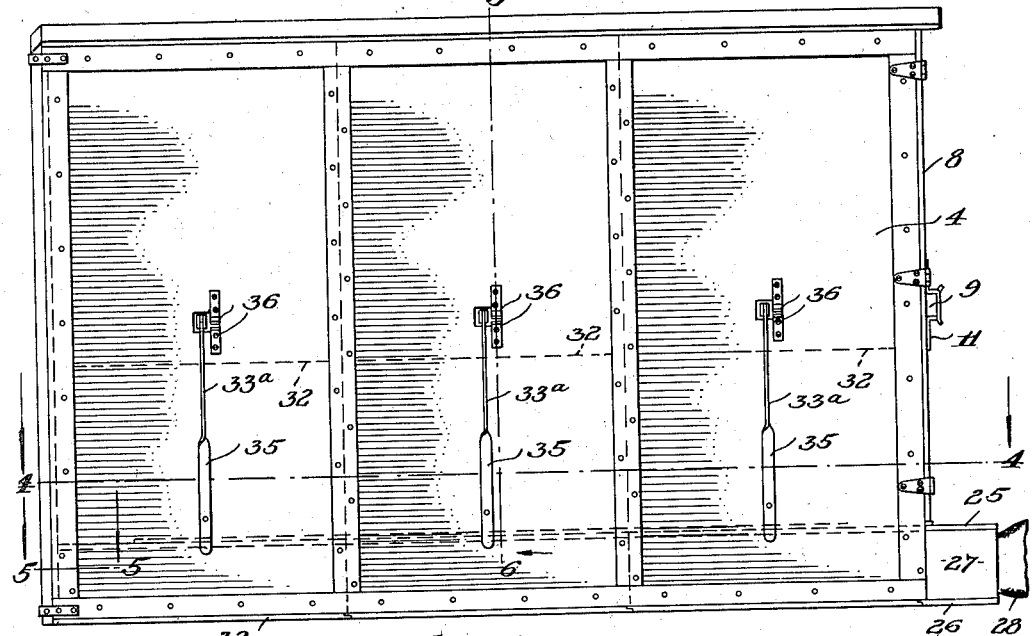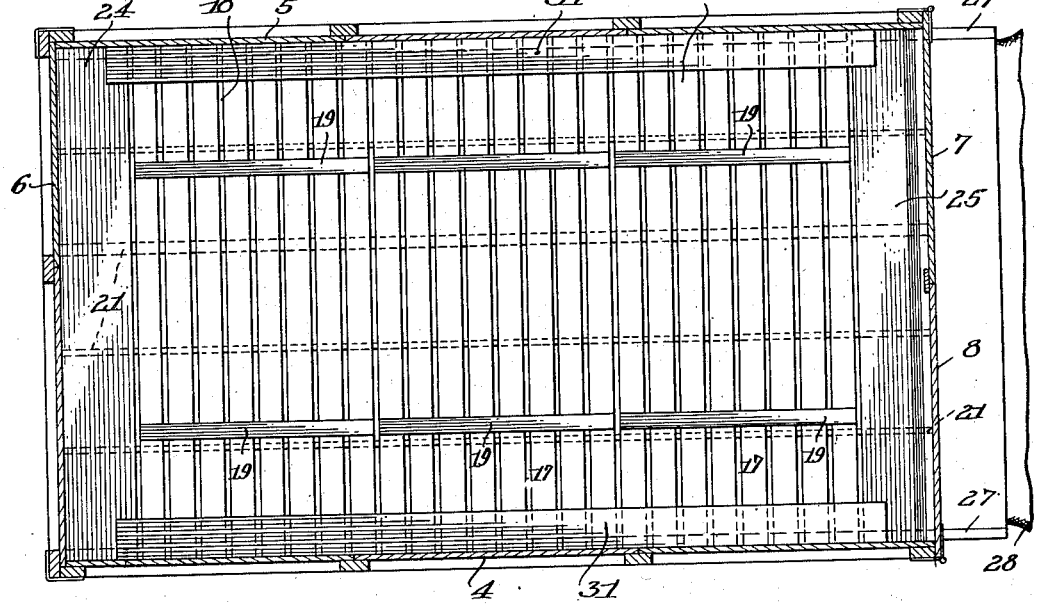

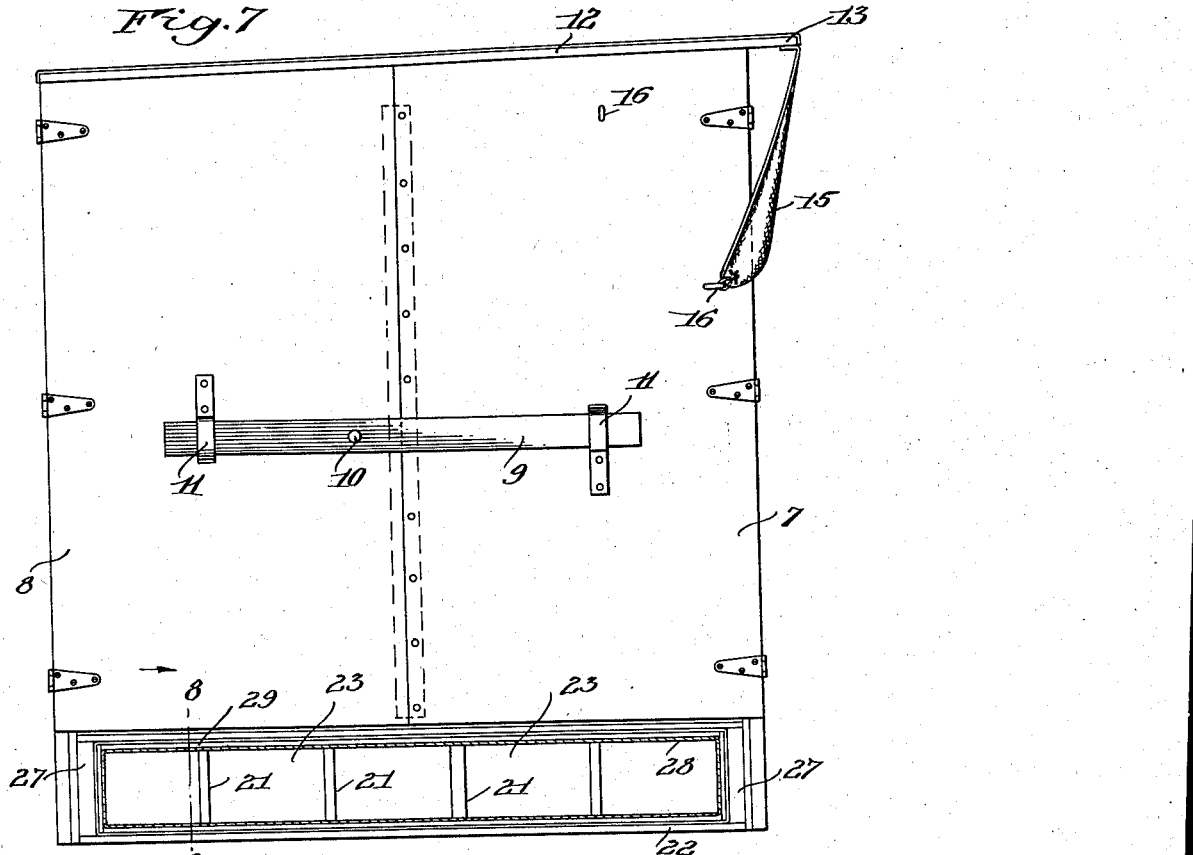
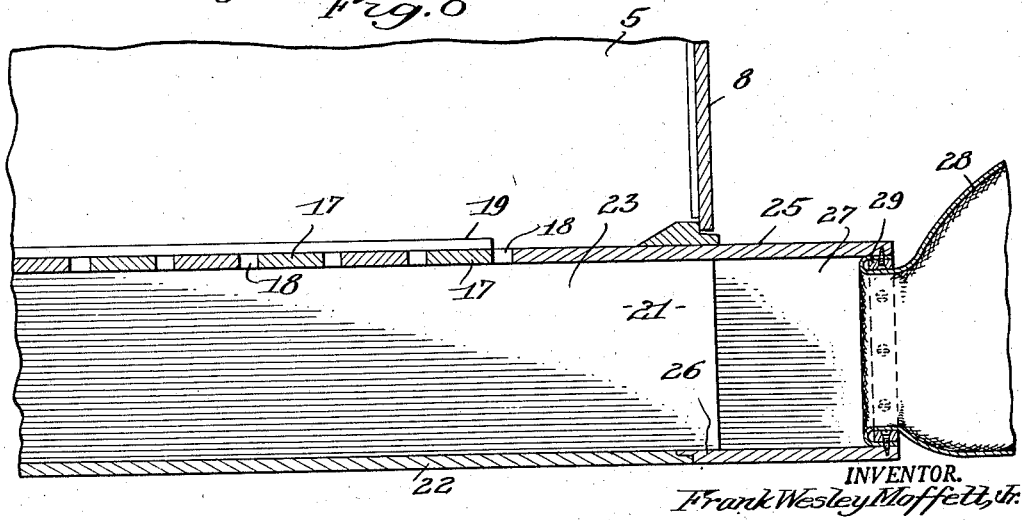

Patented June 22, 1948

2,443,865

UNITED STATES PATENT OFFICE 2,443,865

DRYING TRUCK FOR HAY OR OTHER MATERIALS

Frank Wesley Moffett, Jr., Gates, N. Y.

Application December 7, 1945, Serial No. 633,282

3 Claims. (Cl. 34—233)

This invention relates to a drying truck for handling hay or other materials, and has for its object to afford a portable structure that can be loaded with hay and moved into cooperative relationship with a source of heated air in order to dry the contents thoroughly before removal from the truck, thus enabling hay to be dried in small unit masses in the same truck in which it is carried from a field.

A more particular purpose of the invention is to afford a practical and efficient drying truck that enables ready loading while traveling alongside a moving hay gathering and chopping machine which feeds the hay into the truck, with facilities for insuring uniform distribution of the hay over the truck and obviating greater water content or density of pack at one point than at another.

An additional object of the invention is to afford a drying truck including a foraminate bottom beneath which is located an air chamber divided longitudinally into independent passages and adapted to be connected at one end with a source of heated air under pressure, whereby the heated air is uniformly distributed under and driven upwardly through the hay to effect uniform and quick drying.

A further purpose of the invention is to afford a drying truck that permits quickly connecting the air chamber with a source of heated air and detaching the connection when desired so as to enable loading a truck with hay, quickly treating the contents at a hot air drying station, emptying the hay from the truck, and then reloading, so that a multiplicity of drying trucks can be utilized to remove hay from a field and the contents of each truck thoroughly dried before unloading.

Still an additional object of the invention is to afford a construction that permits of loading hay into a truck through an opening at the top of one wall, and distributing the hay evenly and uniformly over a foraminate bottom, including instrumentalities for preventing excessive packing of the hay at any one part of the truck.

Still another purpose of the invention is to provide a truck construction that enables quickly connecting the air chamber with a source of heated air under pressure by a detachable connection that is positionable out of the way on the truck when not in use, and an arrangement of parts that insures the heated air moving uniformly upwardly through the body of the hay and prevents the hot air traveling through the spaces immediately adjacent to the side and end walls, thus eliminating heat losses and increasing the efficiency and speed of the mechanism.

To these and other ends, the invention consists in the construction and arrangement of parts that will appear clearly from the following description when read in conjunction with the accompanying drawings, the novel features being pointed out in the claims following the specification.

In the drawings:

Fig. 3 is a view in side elevation of the truck;

Fig. 4 is a horizontal sectional view taken on the line 4—4 of Fig. 3 looking in the direction indicated;

Fig. 7 is a rear end elevation, and

Fig. 8 is a longitudinal vertical sectional view on line 8—8 of Fig. 7.

Figure 1:
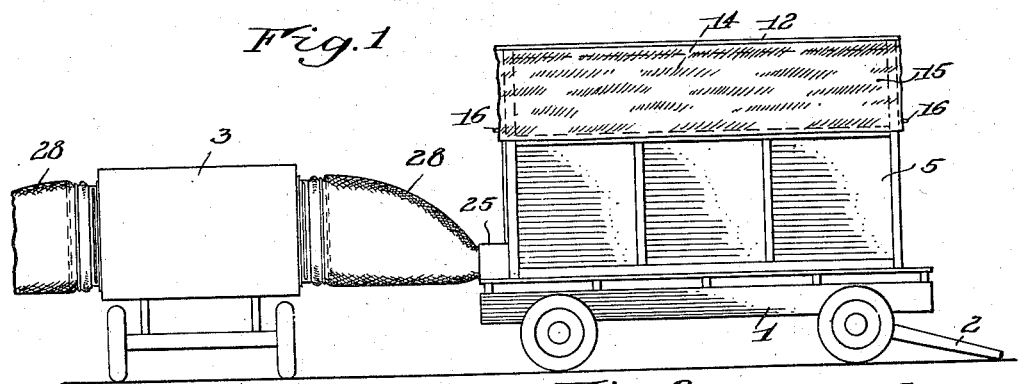
Fig. 1 is a side elevation of a drying truck incorporating a preferred embodiment of the invention and showing it connected with a source of heated air.

Referring more particularly to the drawings in which like reference numerals refer to the same parts throughout the several views, 1 designates generally the chassis of a truck provided with a tongue or link 2 by which it may be connected to a tractor or other transporting means, while 3 designates a conduit leading from a portable hot air generator or other source of heated air under pressure, and detachably connected with the truck in a manner that will appear presently.

The drying truck includes side walls 4 and 5, a front wall 6, and a rear wall including end gates 7 and 8 which are hinged to the side walls. The end gates 7 and 8 are held closed by a locking bar 9 pivoted to the gate 8 at 10 and engageable with cleats 11 to hold the gates in closed position while the truck is being loaded and the hay subjected to the action of heated air for drying purposes.

Figure 2:
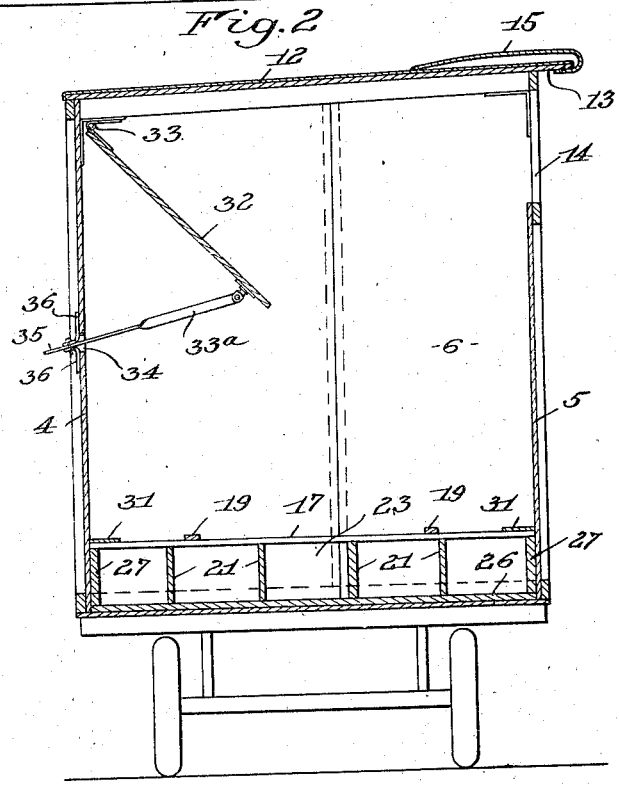
Fig. 2 is a transverse vertical sectional view through the truck, illustrating one of the baffles in operating position to deflect incoming hay as it is loaded to the side of the truck adjacent to the loading opening.
Figure 5:
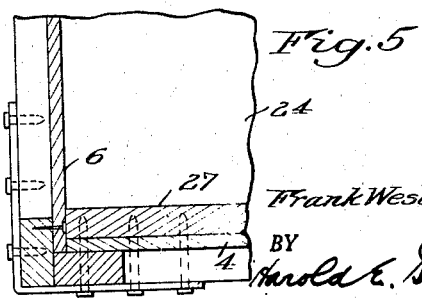
Fig. 5 is a detail horizontal sectional view taken on the line 5—5 of Fig. 3, looking in the direction indicated.

The side wall 5 is somewhat higher than side wall 4, as shown in Fig. 2, and connected therewith by the top 12, the inclination of which is such as to permit ready draining and prevent collecting of water on the top. The top 12 also includes an overhanging portion 13 projecting beyond the side wall 5 just above the loading opening 14, provided at the upper end of the side wall 5. 15 designates a flexible cover of canvas or other suitable material attached to the top 12 and adapted to be dropped down, as shown in Fig. 7, and engaged with hooks 16 to close the loading opening and protect the contents of the truck against rain or dampness when necessary. During the loading operation, the flexible cover 15 can be thrown up over the top 12 and rests thereon.

It will be understood that the truck is drawn over a field by any convenient means and loaded from a hay gathering and chopping machine which moves along with the truck and blows hay in through the loading opening 14. The hay lodges on a foraminate false bottom that preferably consists of three removable sections, each embodying a multiplicity of transverse slats 17 spaced from each other to afford air openings 18 and connected by means of transverse strips 19. The removable foraminate false bottom sections are supported on spaced partitions 21, see Fig. 7, which rest on a suitable base or bottom 22, thus affording an air chamber beneath the foraminate false bottom divided into longitudinal passages 23 which can be readily cleaned whenever necessary by removing the foraminate sections supported thereon.

At the forward end of the foraminate sections is a permanent continuous floor piece 24 resting on the front ends of the partitions 21 and serving as a barrier against upward movement of air at the extreme forward end of the truck, while at the rear end is an inlet comprising a top wall 25 immediately under the end gates 7 and 8, a bottom wall 26, and end walls 27. 28 designates connecting means in the form of a conduit of canvas or other fabric or flexible material, the mouth of which is permanently attached in any suitable fashion around the edges of the inlet opening by suitable fastening strips 29, as shown in Fig. 8, while the opposite end of the flexible conduit 28 is adapted to be detachably fastened to an outlet from the conduit 3 of the hot air generator, as illustrated in Fig. 1. When the drying operation is completed and the truck is being loaded, the flexible conduit 28 is detached from the hot air conduit 3 and stuffed within the inlet opening of the air chamber where it is out of the way.

In order to prevent heated air from passing upwardly through the spaces afforded immediately adjacent the side walls of the truck, there are provided strips of tar paper, kraft paper, or other suitable material 31 laid over the foraminate bottom in contact with the side walls and extending throughout the length of the foraminate bottom, as illustrated in Fig. 4. These strips 31 act as a barrier to stop and deflect the heated air toward the center of the floor and insure its passage upwardly through the body of closely packed hay.

When the truck is being loaded through opening 14, if there is nothing to prevent, the wet hay packs more tightly at the side of the truck away from the wall containing the loading opening 14, and it is essential to obviate this and distribute the hay evenly over the floor in order to insure a uniform distribution of moisture, as otherwise quick efficient drying cannot be had. In order to attain this objective, a series of baffles or deflectors are positioned in the path of the incoming hay as it is loaded.

Figure 6:
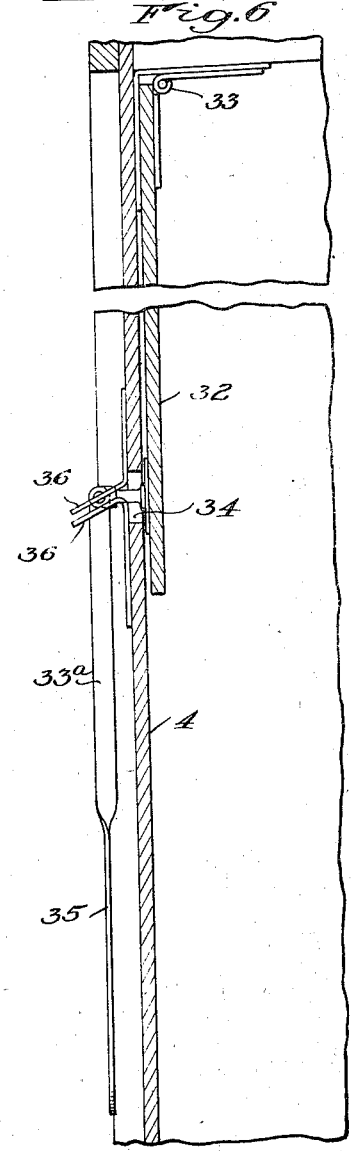
Fig. 6 is an enlarged transverse vertical sectional view taken on the line 6—6 of Fig. 3.

The mechanism shown for this purpose includes baffles 32 pivoted to the top at 33 and each positionable at an angle to the side wall 4 in the path of the incoming hay, as shown in Fig. 2. During the initial part of the loading operation, this causes the hay as it is blown in to strike the baffles 32 and be deflected downwardly to the part of the floor adjacent the side wall 5 containing the loading opening. When this side of the truck is substantially filled up to the bottom of the baffles 32, the latter can be swung downwardly to the position illustrated in Fig. 6, and the incoming hay then falls down to the floor adjacent the side wall 4 and fills up that portion of the truck until it is entirely loaded throughout to a point substantially level with the bottom of opening 14. Each baffle 32 is held in operating position by means of an arm 33$^a$ pivotally connected thereto and movable through an opening 34 in the side wall 4. The arm 33$^a$ is provided with an end portion 35 that can be moved between opposite lugs 36 attached to the side wall, and held in such position by a fastening screw or other suitable means which can be quickly released to permit movement of the arm 33$^a$ and baffle 32 outwardly. When the baffle 32 is in its vertical position, as illustrated in Fig. 6, the arm 33$^a$ can be lowered to a vertical position outside the side wall 4.

While the invention has been described with reference to a particular construction, it is not confined to the detailed arrangement shown herein, and this application is intended to cover such modifications or departures as may come within the purposes of the improvement and the scope of the following claims.

I claim:

1. A portable drying truck for hay or other materials including side walls, one of said side walls having a loading opening at its top, a foraminate false bottom having an open space immediately thereabove capable of supporting a mass of hay over its entire area, a base or bottom, an air chamber between said foraminate false bottom and said base, said air chamber being substantially coextensive with said foraminate false bottom, and a baffle adjustably positionable at an angle to the vertical in the path of the hay as it is fed in through said loading opening.

2. A portable drying truck for hay or other materials including side walls, one of said side walls having a loading opening at its top, a baffle pivotally supported adjacent and adjustable at an angle to the opposite side wall in the path of the hay as it is fed into the truck, a foraminate false bottom having an open space immediately thereabove capable of supporting a mass of hay over its entire area, a base or bottom, an air chamber between said foraminate false bottom and said base, said air chamber being substantially coextensive with said foraminate false bottom, and flexible conducting means associated with said air chamber and detachably connectible with a source of heated air under pressure, said flexible conducting means having substantially the same width as said air chamber.

3. A portable drying truck for hay or other materials including side walls, one of said side walls having a loading opening at its top, a baffle pivotally supported adjacent and adjustable at an angle to the opposite side wall in the path of the hay as it is fed into the truck, a foraminate false bottom having an open space immediately thereabove capable of supporting a mass of hay over its entire area, a base or bottom, an air chamber between said foraminate false bottom and said base, said air chamber being substantially coextensive with said foraminate false bottom, and a conduit leading to said air chamber and detachably connectible with a source of heated air under pressure, said conduit being of substantially the same width as said air chamber.

FRANK WESLEY MOFFETT, JR.

REFERENCES CITED

The following references are of record in the file of this patent:

UNITED STATES PATENTS

| Number | Name | Date |
|---|---|---|
| Re. 15,156 | Iles et al. | July 19, 1921 |
| 149,403 | Hutchins | Apr. 7, 1874 |
| 269,135 | Street | Dec. 12, 1882 |
| 327,893 | Morgan | Oct. 6, 1885 |
| 535,981 | Emerson | Mar. 19, 1895 |
| 626,579 | Viele | June 6, 1899 |
| 716,462 | McElheny | Dec. 23, 1902 |
| 1,039,301 | Leaver | Sept. 24, 1912 |
| 1,381,009 | Pratt | June 7, 1921 |
| 1,579,239 | Owen | Apr. 6, 1926 |
| 1,580,767 | Skromme | Apr. 13, 1926 |
| 1,981,433 | Shodron | Nov. 20, 1934 |
| 2,000,102 | Shodron | May 7, 1935 |
| 2,035,716 | Peek | Mar. 31, 1936 |
| 2,183,915 | Killingstad | Dec. 19, 1939 |
| 2,241,375 | Campbell | May 13, 1941 |
| 2,303,867 | Stebbins | Dec. 1, 1942 |

FOREIGN PATENTS

| Number | Country | Date |
|---|---|---|
| 411,188 | Great Britain | June 7, 1934 |
| 541,946 | Great Britain | Dec. 18, 1941 |

OTHER REFERENCES

"Barn Haydrier," Schaller et al., Agricultural Engineering Development Division of Tennessee Valley Authority. Reprint June 1945 (price $1.00), pp. 19 and 20.